United States Patent [19]

Schoolcraft

[11] Patent Number: 5,729,751
[45] Date of Patent: Mar. 17, 1998

[54] DOCUMENT ASSEMBLY SYSTEM WITH ASSEMBLY LOGIC

[75] Inventor: Alan L. Schoolcraft, Universal City, Tex.

[73] Assignee: Automated Legal Systems, Inc., Universal City, Tex.

[21] Appl. No.: 404,379

[22] Filed: Mar. 15, 1995

[51] Int. Cl.⁶ ........................................ G06F 7/00
[52] U.S. Cl. .............. 395/792; 395/766; 395/793; 395/803
[58] Field of Search ................... 395/144–149, 395/766, 767, 758, 772, 776, 779, 788, 792, 793, 802, 803, 616, 819, 757; 364/419.1, 419, 17, 419.19

[56] References Cited

U.S. PATENT DOCUMENTS

| | | | |
|---|---|---|---|
| 5,043,891 | 8/1991 | Goldstein et al | 364/419.1 |
| 5,132,900 | 7/1992 | Gilchrist et al. | 364/419.19 |
| 5,313,394 | 5/1994 | Clapp | 364/419.1 |
| 5,323,313 | 6/1994 | Davis et al. | 364/419.17 |
| 5,404,518 | 4/1995 | Gilbertson et al. | 395/600 |
| 5,444,615 | 8/1995 | Bennett et al. | 364/401 |
| 5,446,883 | 8/1995 | Kirkbride et al. | 395/600 |

*Primary Examiner*—Joseph H. Feild
*Assistant Examiner*—Stephen Hong
*Attorney, Agent, or Firm*—Baker & Botts, L.L.P.

[57] ABSTRACT

A system and method for assembling and displaying information include a run time module (12) coupled to documents (14–16). The run time module (12) is also coupled to a user interface (18). The run time module processes codes embedded in the documents (14–16) by making use of assembly questions databases (20), assembly answer database (22), merge phase questions databases (24), merge answer database (26), logic database (28), merge phase code list (30), and other memory (32). The codes in the documents provide an index to the questions databases and to the logic databases, so that questions and logic pertaining to how the assembly is to occur may be generated by separate programming as a dynamic process as the assembly occurs. Assembly occurs in a two part process, where a first phase determines what text is to be included in a document and a second phase determines how that text is to be modified for a particular document.

26 Claims, 4 Drawing Sheets

ASSEMBLY OR MERGE QUESTIONS DATABASE STRUCTURE

| QUESTION CODE | LOGIC FLAG | VALIDATION | QUESTION DATA, INCLUDING TEXT AND FORMATTING INFORMATION |
|---|---|---|---|
| QUESTION CODE 0 | LOGIC FLAG | VALIDATION | QUESTION DATA, INCLUDING TEXT AND FORMATTING INFORMATION |
| QUESTION CODE 1 | LOGIC FLAG | VALIDATION | QUESTION DATA, INCLUDING TEXT AND FORMATTING INFORMATION |
| QUESTION CODE 2 | LOGIC FLAG | VALIDATION | QUESTION DATA, INCLUDING TEXT AND FORMATTING INFORMATION |
| QUESTION CODE 3 | LOGIC FLAG | VALIDATION | QUESTION DATA, INCLUDING TEXT AND FORMATTING INFORMATION |
| ⋮ | ⋮ | ⋮ | ⋮ |
| QUESTION CODE n−1 | LOGIC FLAG | VALIDATION | QUESTION DATA, INCLUDING TEXT AND FORMATTING INFORMATION |
| QUESTION CODE n | LOGIC FLAG | VALIDATION | QUESTION DATA, INCLUDING TEXT AND FORMATTING INFORMATION |

20,24

OTHER DATABASE

*FIG. 4*

LOGIC DATABASE STRUCTURE

28

| P0001 | CONDITION (LOGIC) | ACTION | RETURN VALUE |
|---|---|---|---|
| P0001 | CONDITION (LOGIC) | ACTION | RETURN VALUE |
| ⋮ | ⋮ | ⋮ | ⋮ |
| P0001 | CONDITION (LOGIC) | ACTION | RETURN VALUE |
| P0002 | CONDITION (LOGIC) | ACTION | RETURN VALUE |
| ⋮ | ⋮ | ⋮ | ⋮ |
| Pnnnn | CONDITION (LOGIC) | ACTION | RETURN VALUE |
| I0001 | CONDITION (LOGIC) | ACTION | RETURN VALUE |
| ⋮ | ⋮ | ⋮ | ⋮ |
| Xnnnn | CONDITION (LOGIC) | ACTION | RETURN VALUE |

*FIG. 5*

DOCUMENT ASSEMBLY SYSTEM WITH ASSEMBLY LOGIC

TECHNICAL FIELD OF THE INVENTION

This invention relates generally to information processing systems, and more particularly to a system and method for assembling and presenting information.

BACKGROUND OF THE INVENTION

Most information is conveyed to humans through the use of words (whether spoken, printed, or displayed) and graphical images. In very many subject areas, virtually all of the information related to a particular topic can be gathered and compiled in a somewhat manageable form, such as a book, computer file, treatise, encyclopedia, or other such compilation, including text and graphics.

While it is useful to have such compilations of information related to particular subjects, a person desiring access to a subset of the information is faced with a sorting task. That is, the desired information must be sorted from all the rest of the compiled information related to that subject. To assist in this sorting process, various systems have been developed, such as indexes, search routines (for example, on computer systems), and expert systems. While these sorting aids are useful, they are very often over-inclusive or under-inclusive in their results.

In certain applications, such under-inclusive or over-inclusive search results are not acceptable. A particular example is in the legal profession, where it is often necessary to prepare specifically tailored legal documents, such as wills or divorce decrees (to name just two of a myriad of possibilities). To prepare such legal documents, lawyers often resort to similar documents that have been previously prepared. However, since each case is different, adjustments, additions, and deletions must always be made, and it takes great effort to ensure that all appropriate provisions, and no unnecessary provisions, are included in the final document, since inclusion or omission of certain provisions can be extremely costly. Thus, while indexing and searching systems are valuable in assisting in the preparation of such documents, they require significant effort on the part of the user.

Several document assembly systems exist for assisting in the assembly of documents, such as legal documents. Generally speaking, these systems include virtually all provisions that could relate to a particular subject. Then, through a series of questions to the user, the appropriate provisions are assembled in a final document tailored to the user's needs. Using the divorce decree example above as an illustration, all possible provisions for use in a divorce decree may result in a document some 100 pages long. However, because most of these provisions will be irrelevant to a particular situation, through a series of questions directed to the user, perhaps 80% of the provisions may be deleted, resulting in a 20 page divorce decree. However, many existing document assembly systems are inefficient, and difficult to develop and modify.

Therefore, a need has arisen for an improved document assembly system that allows for efficient document assembly, as well as for simplified development of the system for assembling the documents.

Furthermore, a need has arisen for a general system and method that allows for the assembly and display of information appropriate to a user's request. In particular, the accessed information should provide no more or less information than requested.

Additionally, a need has arisen for a system in which a user is required to provide only that information actually necessary to perform an intended task, and which cannot be otherwise determined by the system.

SUMMARY OF THE INVENTION

In accordance with the teachings of the present invention, a method and apparatus for assembling and presenting information are provided which substantially eliminate or reduce disadvantages and problems associated with prior art systems.

In particular, a document assembly system is provided in which a run time module memory stores run time instructions. A document memory is used to store a document, and the document includes a plurality of manipulation codes and a plurality of question codes. A question database includes a plurality of question records, with each of the question records including question information associated with each respective question code. A logic database is provided that includes a plurality of logic records, each of the logic records being associated with a corresponding question code or manipulation code, and each logic record including a condition field and an action field. A processor is coupled to the run time module memory and the document memory, and is operable to sequence through the document to identify the codes. The processor is also operable to, upon encountering any one of the manipulation codes, evaluate the condition field of the associated logic record to determine whether to execute actions contained in the action field of the associated logic record. Execution of the actions, if performed, results in manipulation of the document. The processor is also operable to, upon encountering any one of the question codes, evaluate the associated question information to determine whether an associated logic record exists, and, if no associated logic record exists, the processor is operable to use the question information to present the question and receive an answer. If an associated logic record does exist, the processor is further operable to evaluate the condition field of the associated logic record to determine whether to execute actions contained in the action field of the associated logic record.

In a particular embodiment, an assembly questions database is provided which includes assembly questions information. The processor is operable to process the assembly questions before sequencing through the document.

Also provided is a method of assembling a document, which includes sequencing through the document to identify codes, with the codes including question codes and manipulation codes. Upon encountering one of the manipulation codes, the method includes evaluating a condition field of an associated logic record of a logic database to determine whether to execute actions contained in an action field of the associated logic record. Execution of the actions, if performed, results in manipulation of the document, the method also includes, upon encountering any one of the question codes, evaluating question information of an associated questions database to determine whether an associated logic record exists and, if no associated logic record exists, using the question information to present a question or receive an answer. If an associated logic record does exist, the method includes evaluating the condition field of the associated logic record to determine whether to execute actions contained in the action field of the associated logic record.

An important technical advantage of the present invention is the fact that a run time module is used to search for codes that have been embedded within a document. Once such codes are encountered, the run time module accesses the associated record of a logic database and executes the logic and actions in the condition and action fields of the associated logic record. In this way, a developer is provided with a powerful tool for developing document assembly systems. Rather than having to rewrite complicated source code, a developer need only embed codes within a master document and then add one or more records to the logic database that provide the appropriate conditions and actions to be taken in response to the embedded codes. If an embedded code is related to a question, then the developer will also add an associated record to a questions database. No modifications to the run time module need be made, and development is therefore extremely efficient.

Another important technical advantage of the present invention is that logic records in a database are used to define relationships between data, by using logic and answers to previously asked questions.

BRIEF DESCRIPTION OF THE DRAWINGS

For a more complete understanding of the present invention, and the advantages thereof, reference is now made to the following descriptions taken in conjunction with the accompanying drawings, in which:

FIG. 4 is an illustration of a questions database structure according to the teachings of the present invention;

FIG. 5 is an illustration of a logic database structure according to the teachings of the present invention;

DETAILED DESCRIPTION OF THE INVENTION

Figure 1:
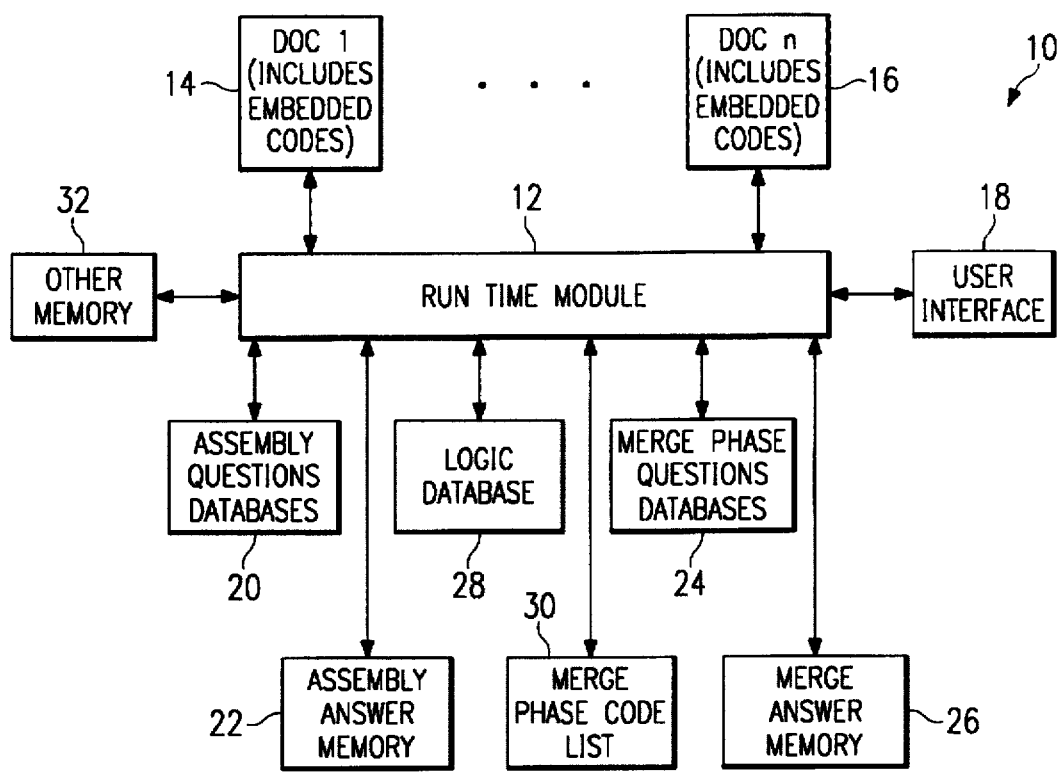
FIG. 1 is a block diagram of a document assembly system according to the teachings of the present invention.

As shown in FIG. 1, a document assembly system 10 is provided in which a run time module 12 accesses a plurality of documents 14 through 16. The documents 14-16 are text and/or graphics stored in memory. Run time module 12 includes a set of executable instructions that control the flow of the system to be described. The source code for these instructions may be written in most any programming language.

Each of the documents 14 through 16 are initially master documents that include virtually all information related to a particular subject or topic. As an example, document 14 may include every provision related to a divorce decree, and document 16 may include every provision relating to a divorce petition. Although examples of documents relating to the legal profession are provided in this description, other types of documents may be assembled as well, and are within the scope of the present invention. Moreover, the general structure described herein may be applied to systems other than document assembly systems, as will be discussed below.

By interacting with a user through a user interface 18, run time module 12 operates to manipulate documents 14-16 to present a final document or set of documents tailored to the user's needs. To accomplish this, run time module 12 makes use of information stored in various databases and memory shown in FIG. 1. In particular, run time module 12 accesses assembly questions databases 20 to present various questions and to receive answers from the user. These answers are stored in assembly answer memory 22. Similarly, run time module 12 accesses merge phase questions databases 24 to present various questions and to receive answers from a user through user interface 18, and stores these answers in merge answer memory 26. Databases 20 and 24, and memory 22 and 26 may be separate or combined.

Run time module 12 also accesses logic database 28 and merge phase code list 30, to be discussed below. Run time module 12 also has access to other memory, designated by reference number 32 in FIG. 1.

The documents 14-16, as discussed above, include all of the information related to a specific topic, and each specific document is directed to a particular subtopic or purpose (such a petition, decree, or letter, for example) of one subject. Generally, this information will be in the form of text and graphics. In response to requests from a user, this information is manipulated by run time module 12 such that final documents are prepared that are precisely tailored to the user's needs. The technique by which run time module 12 assembles these final documents is best understood by reference to FIGS. 2-5.

Figure 2:
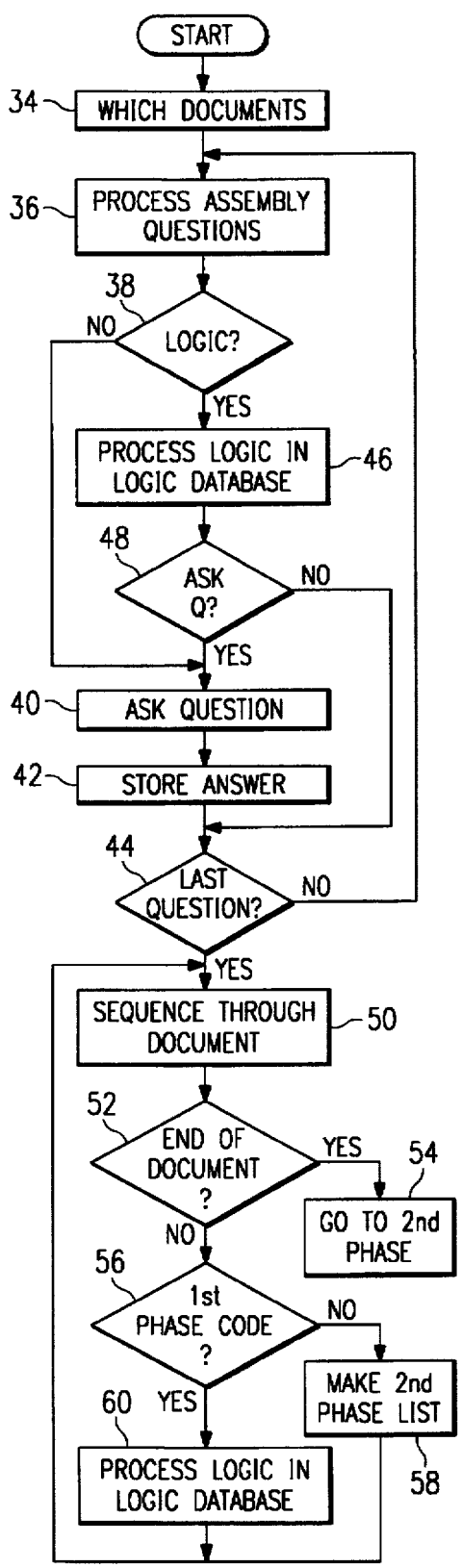
FIGS. 2 and 3 are flow diagrams of a document assembly system according to the teachings of the present invention.

As shown in FIG. 2, run time module 12 first requests which documents the user desires to assemble. This is shown at step 34 of FIG. 2. Once the user inputs this information, run time module 12 will present a series of questions to the user related to each of the documents that have been selected. These questions are contained in assembly questions databases 20. In particular, assembly questions databases 20 include all initial questions that must be asked for all of the possible documents that can be chosen. Only the subset of these questions that are appropriate to the documents selected by the user are actually presented to the user, however. Some of the questions may be common to several documents, and these questions need only be asked once.

Before presenting a question to the user, however, the question is processed at step 36 of FIG. 2. In particular, before presenting the question to the user, run time module 12 checks to see whether a logic flag associated with the question has been set. This is illustrated at step 38 of FIG. 2. If no logic flag has been set, then the question is asked at step 40, and the answer is stored in assembly answer database 22 at step 42. Also, the validity of an answer can be evaluated after receiving the answer, as will be discussed below in connection with FIG. 4. This validation step may be performed after any answer is received. If another question remains to be asked, then at step 44 run time module 12 loops back to process the next question.

If at step 38 the logic flag associated with a particular question has been set, then run time module 12 accesses logic database 28 at step 46 of FIG. 2. In particular, run time module 12 accesses a record of logic database 28 corresponding to the particular question being processed, and processes logic contained within that record. The details of logic database 28 will be discussed below. The logic within logic database 46 for a particular question may accomplish various functions. In particular, the logic may result in a skipping of the question, for example if a previously asked question has made the answer irrelevant, or if a previously asked question or questions have answered the question being processed. In the latter case, the answer can be assigned, based on answers to previous questions, or copied from another answer, if the answers must be the same. In such cases, then at step 48 of FIG. 2 run time module 12 will branch to step 44.

As another alternative, the logic in logic database 28 corresponding to a particular question being processed may result in assignment of a default answer to the question that can be displayed along with the question, allowing the user to simply agree with the default answer or change it. For example, in a divorce decree, a question being processed may ask for the address of a minor child. The logic within logic database 28 associated with that answer may assign as a default answer the address of the petitioner. However, the question, with that default answer displayed, will still be presented to the user. In such a case, run time module 12 branches at step 48 to step 40 to ask the question with the displayed default answer.

If at step 44 the last assembly question has been asked, then run time module 12 branches to step 50 of FIG. 2. At step 50, run time module 12 sequences through documents 14–16. This sequencing process involves searching for specific codes that have been embedded within these documents. These codes are embedded during the development process, and result in further questions or actions to adjust the documents 14–16. Once the end of the documents being processed are reached, then at step 52 run time module 12 branches to the second phase at step 54, which will be discussed below in connection with FIG. 3.

When a code is encountered, then at step 56 run time module 12 determines whether the code is a first (assembly) phase or a second (merge) phase code. The codes that are embedded within the documents have an indicator, such as a "~" to identify the codes to the run time module 12. Each code has a "type," such as I (for insert), and a numerical identifier, and thus, for example, a particular insert code may have the designation I0001.

If the code is a second phase code, then the specific code is added to a second phase list at step 58. If at step 56 the encountered code is a first phase code, then run time module 12 branches to step 60 and processes the logic in logic database 28 that corresponds to that particular code. Run time module 12 branches from both steps 58 and 60 back to step 50 to sequence through the document to search for the next code.

As can be seen from steps 56–60, a two-phase approach is provided. This two-phase approach provides a significant advantage to the present invention. In particular, the first phase (assembly) codes include insert and delete codes, although other codes may also be included. Therefore, during the first phase, when an insert or delete code is encountered, the logic associated with that code is actually processed at step 60, and the documents 14–16 are adjusted accordingly. As discussed above, significant portions of these documents are usually deleted as unnecessary to the user's needs. By deleting this information in the first phase, any embedded codes within the deleted information are also deleted, and thus run time module 12 does not waste time needlessly processing codes related to irrelevant information.

The assembly phase questions request basic information necessary for determining which clauses and paragraphs will be needed in the documents. For example, in a legal document such as a will, whether or not the testator is married is used to determine which questions to ask as well as what paragraphs will be needed in the document. Thus, an assembly question will ask whether the testator is married.

However, questions that are necessary only for information that may be discarded will be asked only after it is determined that that information is to be kept within the final document. Such questions are asked during the second (merge) phase.

Figure 3:
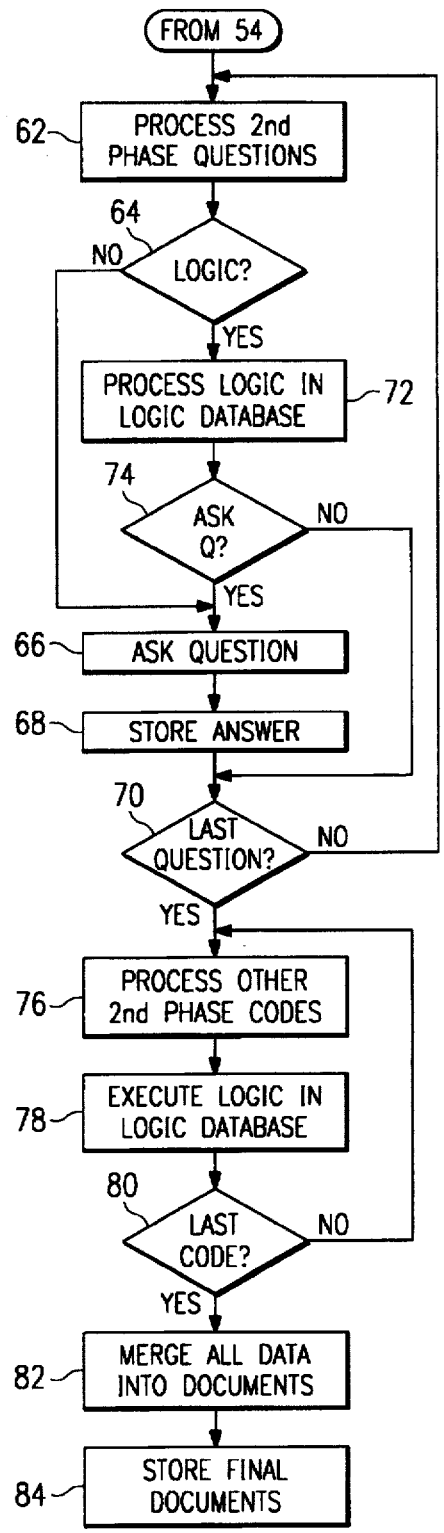

FIG. 3 illustrates a flow diagram of the second phase processing performed by run time module 12. As shown in FIG. 3, step 62 is encountered after step 54 of FIG. 2. Step 62 involves processing second phase questions. These second phase questions are those questions associated with question codes that have been compiled in the second phase list at step 58 of FIG. 2. As discussed above in connection with step 58, during the initial pass through the documents, any second phase codes are compiled in a list (shown as block 30 of FIG. 1). Some of these codes may be question codes, which have associated with them questions that request information from the user related to provisions not deleted in the first phase.

Similarly to the processing of the assembly phase questions discussed above, before processing a second phase question, run time module 12 checks to see whether a logic flag associated with the particular question is set. This is performed at step 64. If the logic flag is not set, then the question is asked at step 66, and the answer is stored at block 68. These answers are stored in the merge answer database 26 of FIG. 1. If at step 70 it is determined that the last question has not been asked, then run time module 12 branches back to step 62.

If at step 64 the logic flag of a particular second phase question has been set, then logic associated with that question contained within logic database 28 is processed at step 72. This logic may result in skipping of the question at block 74 for the reasons discussed above. Similarly, the logic process at step 72 may result in asking of the question with a default answer assigned to it.

Once it is determined at step 70 that the last merge phase question has been asked, then any other second phase codes contained within the list compiled at step 58 are processed at step 76. Such codes include merge phase insert codes, merge phase delete codes, calculation codes or other codes.

A table is provided below that lists exemplary codes (both first and second phase) which may be embedded within a document. It should be understood that these codes are exemplary, and other codes (such as codes for displaying messages, for example, warning messages) may be used as well without departing from the intended scope of the present invention. The codes generally fall into two categories—question codes and manipulation codes.

TABLE 1

| CODE | FUNCTION |
| --- | --- |
| I, R (INSERT)<br>(I-Assembly Phase<br>R- Merge Phase) | Insert text. E.g., insert "child" or "children" depending on answer to question concerning number of children. |
| D (Delete) | Delete until an "end delete" token is encountered. E.g., delete provisions relating to children if none involved. |
| A (Assembly Question) | Not necessarily an embedded code, but referenced by a code number in databases. Asks a question and stores answer (unless logic provides otherwise). |
| P (Merge Question) | Asks a question and stores answer (unless logic provides otherwise). |

TABLE 1-continued

| CODE | FUNCTION |
| --- | --- |
| C (Calculate) | Calculates a value based on responses to various questions. |

The logic within logic database 28 associated with particular second phase codes are executed at step 78. Run time module 12 branches back to step 76 until there are no more second phase codes to process. This branching occurs at step 80. Once the last second phase code has been processed, all data from the answer databases 22 and 26 is merged into the documents at step 82. Furthermore, any other information that has been developed by the execution of the logic within logic database 28 and that must be merged into the documents is also merged at step 82. Such other information includes, for example, calculation data. As an example of calculation data, in a divorce decree that includes a provision for child support, questions may be asked as to the child support obligor's income. Based on the answers to these questions, the run time module 12 will calculate appropriate child support amounts. These amounts are stored in memory 32 of FIG. 1, and merged into the final document at the appropriate locations at step 82 of FIG. 3. At step 84, the final documents are stored for access by the user, such as printing. Typically, the documents will be stored in the format compatible with a word processor so that the user can further manipulate them as desired.

FIG. 4 illustrates a database structure for the assembly or merge questions databases. As shown in FIG. 4, each record corresponds to a particular question, and each record contains several fields. The first field contains the question code, which is an identifier for a particular question, such as A0001 or P0001. As discussed above, assembly phase questions are processed at steps 36–44 of FIG. 2, while merge phase questions are processed at steps 62–70 of FIG. 3. To process a question, the associated record of the questions database is accessed by using the question code. A logic flag field is then evaluated, to determine whether logic should be processed before asking the question.

Each record also contains a validation field. If the flag in this validation field is set, an answer given to a question will be validated. The validation is performed by accessing a validation database, similar to that described below in connection with FIG. 5. The validation process ensures that, based on previous answers, the answer to the question being processed is valid. For example, if previous answers have indicated that three children are involved in a divorce proceeding, if later only two names are provided, a message can be displayed to remedy the inconsistency. Thus, the validation field is evaluated after an answer is given, while the logic field of the questions database is evaluated before the question is asked. The validation database can have the same structure as that described below in connection with FIG. 5. Furthermore, it should be understood that the validation field database need not be included. Moreover, the questions database of FIG. 4 could have other field layouts than that shown without departing from the intended scope herein.

Each record in the questions databases also includes a question data field for the actual text of the question as well as formatting information for presenting the question and receiving the answer from the user. The question data field may be included within the database as shown in FIG. 4, or may be included in a separate database also accessed through use of the question code.

FIG. 5 illustrates the logic database structure for the logic database 28 of FIG. 1. As shown in FIG. 5, each logic record within the logic database includes four fields. However, it should be understood that different field layouts may be used without departing from the intended scope herein. For example, as will be discussed below, the third and fourth fields may be combined.

The first field is an identifier which relates each particular record to a code. For example, as shown in FIG. 5, there are several records associated with code P00001, which may be a merge phase question that has logic associated with it. Likewise, code P0002 has a logic record associated with it, as does code Pnnnn. Another type of code, such as an insert code I0001 also has logic associated with it, and therefore has a record within logic database 28. Any code that is embedded within the documents, or any other code, such as those associated with the assembly phase questions, that require logic to be performed will have one or more records associated with them within the logic database 28.

The second field of each logic record within logic database 28 shown in FIG. 5 is a condition field. This condition field includes logical expressions, such as Boolean logic, mathematical formulae (e.g., x>y), or any other type of logic, to be evaluated by run time module 12. These conditional logic expressions will be evaluated to determine what action to take. If the conditional logic is false, then run time logic 12 will determine whether any other records in the logic database 28 are associated with the particular code being processed, because, as illustrated in FIG. 5, several logic records may exist for each code. If no more records are associated with the particular code being processed, then no action need be taken. If additional records do exist, then they will be evaluated. If the conditional logic of any record associated with a particular code being processed evaluates as true, then the third field (action field) associated with that record is processed by run time module 12. In particular, the third field contains instructions (such as executable commands) which direct some action to be taken. The third field is used in conjunction with the fourth ("return value") field. The third and fourth fields may be combined in a single field. Furthermore, no third field is needed, for example when the action to be taken is incorporated in the identity of a code, such as insert in an 'I' code.

The logical expressions that may be contained within the condition field of any logic record may be simple or complex, and make use of the answers given to the various questions, or other information, such as previously performed calculations. In particular, they often make use of the answers stored in answer memory 22.

Exemplary actions contained in the third field include skip, copy, default, assign, calculate, insert, import, delete, merge, and display, among any other suitable actions. The skip, copy, default, and assign actions, for example, are used in connection with question codes.

The return value field contains an object (such as a string constant, string, mathematical expression, boolean logic, address, or other object) on which an action operates. For example, for an insert action, the text or address of text to be inserted is contained in the return value field. As other examples, the return value field may contain a value (e.g., a number or textual string, among others) to show as a default, an expression to be evaluated (for example, a mathematical expression used in connection with an assign, default, calculate, or other action), an end delete token (e.g., the place in the document to delete up to), among many others. Another example of a return value object includes the address of another device or source for information to be used. Examples of such information include text, time, status, or other information.

The term "action field" is used broadly herein to designate any field used in connection with some action, such as the third, fourth, or third and fourth fields described above.

The condition and action fields define relationships between data by, for example, using answers to questions to determine whether to execute various actions, and then at times using previous answers in carrying out an action such as assigning an answer. Following is an example of the operation and use of logic database 28. An insert code is encountered by run time module 12. The run time module 12 then accesses the associated record in database 28, and evaluates the condition field. For example, the condition field may include the expression "A1148V=3 and A9890V=2." This expression evaluates whether the answer to question A1148 is 3 and the answer to question A9890 is 2. If this expression is true, then the action field results in insertion of the result of the return value field. The return value field may contain any expression, or a simple reference to another answer, such as "P4072V." In this latter case, the answer to question P4072 would be inserted where the insert code was found. If the condition field does not evaluate true, then additional associated logic records will be processed. As discussed above, most any conceivable action can be executed.

Therefore, the logic database of the present invention provides a significant technical advantage. In particular, codes can be embedded within a document to perform some function, such as inserting the response to a question, deleting text, or inserting text from an external source. Once such a code is encountered, the run time module 12 accesses the associated record in the logic database and executes the logic and commands in the condition and action fields. In this way, a developer is provided with a powerful tool for developing document assembly systems. Rather than having to rewrite complicated source code, a developer need only embed a code within a master document, and then add one or more records to the logic database that provide the appropriate conditions and actions to be taken in response to the embedded codes. If an embedded code is related to a question, then the developer will also add an associated record in the questions database. No modifications to the run time module 12 need be made, and development is therefore extremely efficient.

Figure 6:
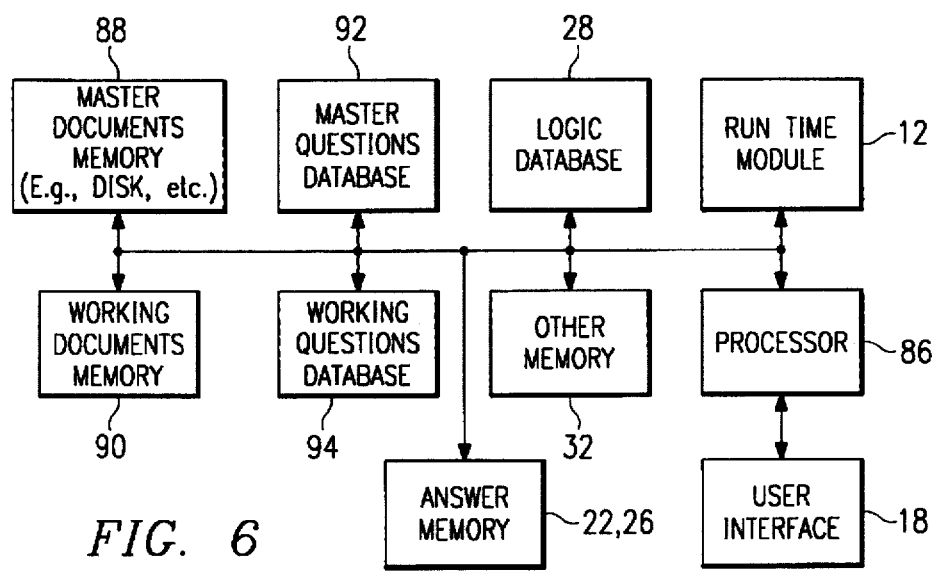
FIG. 6 is a block diagram of a processor and memory system according to the teachings of the present invention.

FIG. 6 illustrates a block diagram of the hardware for the system 10 shown in FIG. 1. The system described herein, and the hardware of FIG. 6, may be implemented with a personal computer type system, although other computer systems may be used as well, such as notebook computers and more powerful computers. As shown in FIG. 6, a processor 86 is coupled through a bus to memory containing the run time module 12 (run time module memory) and the various databases and the memories shown in FIG. 1. These memories may be of most any kind, such as RAM, ROM, magnetic, or other memory types. The processor 86 is also coupled to user interface 18, which may comprise a display device such as a monitor, an input device such as a keyboard and mouse, and a printer, among many other possible user interface devices. As shown in FIG. 6, processor 86 is also coupled to a master documents memory 88. As shown, this master documents memory 88 may be a mass storage device, such as a hard disk drive or floppy disk drive, or other such device. It should be understood, however, that the master documents need not be on a disk, and may be stored in random access or read-only memory.

The master documents memory 88 includes the master documents from which particular documents will be assembled for a particular user's needs. Once a user determines which documents he desires (at step 34 of FIG. 2), the master documents corresponding to those chosen documents are stored within working documents memory 90. Working documents memory 90 corresponds to the blocks 14-16 shown in FIG. 1. These working documents then will be adjusted by the run time module 12 as discussed above to result in the final documents desired by the user.

Similarly, a master questions database 92 is provided with all possible questions associated with all the documents stored within master documents memory 88. Only a subset of those questions will be asked, depending on which documents the user chooses. A list of those questions to be asked are stored in working questions database 94. Working questions database 94 may include all information on the questions to be asked or just the codes that allow mapping to the appropriate questions within master questions database 92. Question codes compiled in merge phase code list 30 may be stored in this database 94 as well.

As shown in FIG. 6, working questions database 94, answer memory 22 and 26, and other memory 32 include information related to a particular set of documents chosen by a user. The merge phase code list 30 may be stored, for example, in memory 32. The information stored in these memories, as well as that stored in working document memory 90, is stored upon completion of the session by the user. If the user later desires to modify these same documents, or assemble other related documents, then the stored information can be recalled, and previous answers, calculated information, and any other information stored from previous operations can be used to assemble the documents requested in the second session. In this way, document assembly is made extremely efficient, as duplication of questions and answers is not required.

Figure 7:
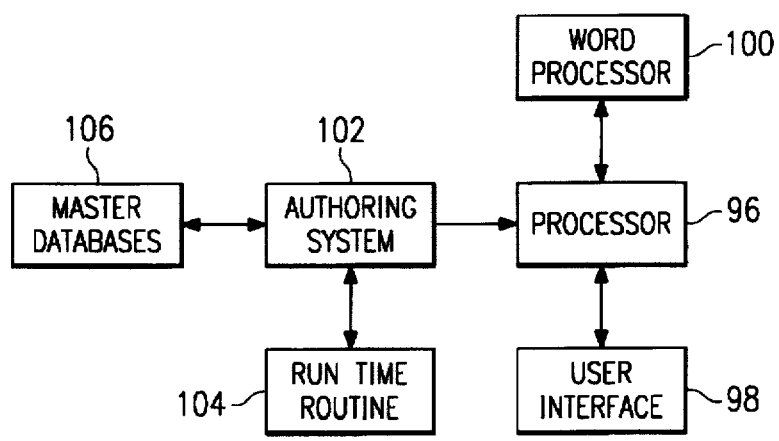
FIG. 7 is a block diagram of a development system according to the teachings of the present invention.

FIG. 7 illustrates a block diagram of a development system for creating a document assembly system according to the teachings of the present invention. This development system may be implemented on a personal computer class computer, among others, such as notebook computers and more powerful computers. As shown in FIG. 7, a processor 96 is coupled to a user interface 98. Processor 96 is also coupled to a word processor 100. A user, through user interface 98, is able to use word processor 100 to develop a master document and embed within it various codes. Furthermore, processor 96 is coupled to an authoring system 102. The user, through the use of this authoring system, can develop a run time routine 104 (corresponding to run time module 12) for processing the documents and embedded codes developed in connection with word processor 100. Through the use of authoring system 102 the user is also able to develop the master databases shown at block 106. This block 106 corresponds to the logic database 28, the master documents memory 88, and the master questions database 92.

Figure 8:
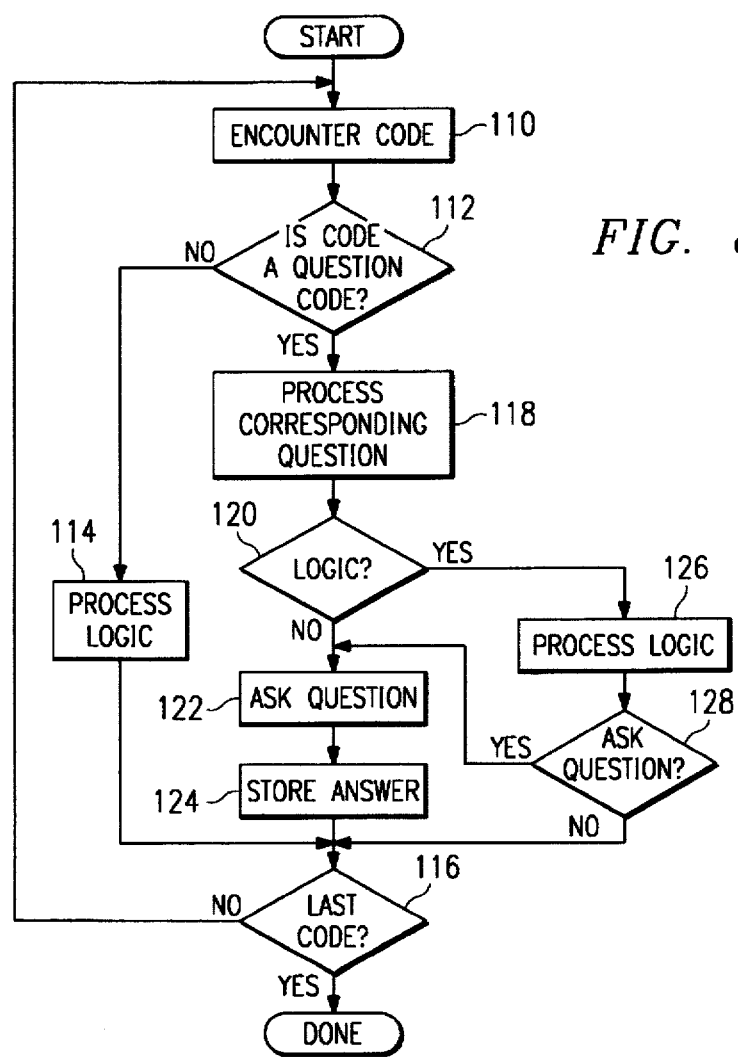
FIG. 8 is a flow diagram of logic database processing according to the teachings of the present invention.

FIG. 8 illustrates a flow diagram of a logic database processing system according to the teachings of the present invention, which makes use of the principles discussed above. As shown in FIG. 8, at block 110 a run time module encounters a code, which may be embedded in a document, or simply listed in a list of codes. At block 112, the run time module determines whether the code is a question code. If it is not a question code, then block 114 is encountered, wherein logic associated with the encountered code is processed. This logic is contained within a logic database, such as logic database 28 shown in FIG. 1. After step 114, if the last code has been encountered, then the routine is completed at step 116. If, however, more codes are to be processed, then at step 116 the routine branches back to step 110.

If at step 112 a question code is encountered, then the corresponding question is processed at step 118. As discussed above, processing of a question involves checking whether a logic flag has been set, which is shown at step 120 of FIG. 8. If no logic flag has been set, then the question is asked at step 122, and the answer stored at step 124, with the routine then branching to step 116. If at step 120 a logic flag has been set, then the logic associated with the question code is processed at step 126. Once again, this logic is contained within a logic database. After processing the logic, then step 128 is encountered to determine whether to ask the question or skip the question, as discussed above in connection with FIGS. 2 and 3.

This general routine shown in FIG. 8 is provided to illustrate how the present invention can be used in applications other than document assembly, such as for presenting information in response to various questions. Such an application may be at a nurse's station in a hospital. The system will include a list of codes, with at least one code asking for the patient's condition. The nurse or other health care official can, in response to the question, enter information on the condition of a patient (which may be selected from a displayed menu). The run time module will then encounter a code which evaluates the answer to determine what information to display in response to that condition. Alternatively, the entered information may result in another question asking for further information. With the flow diagram shown in FIG. 8, a developer can easily implement a logic tree system by simply creating a list of codes and adding logical expressions and question information to a logic database and a questions database, respectively.

It should be understood that while the various databases are shown as distinct logical units, they may be combined in a single database, contained in single memory, or distributed or separated differently than shown. The arrangement shown in the various FIGUREs is to convey the logical distinction between the various databases.

Although the present invention has been described in detail it should be understood that various substitutions, alterations, and modifications can be made without departing from the intended scope as defined by the appended claims.

What is claimed is:

1. A document assembly system for interactively assembling a document, comprising:

a run time module memory in which run time programming is stored;

a document memory in which a document is stored, said document including a plurality of manipulation codes and a plurality of question codes;

a question database including a plurality of question records, each of said question records including question information associated with each respective question code;

a logic database including a plurality of logic expressions, each of said logic expressions indexed by a corresponding question code or manipulation code and representing programming to be executed as said document is being assembled;

wherein said run time programming instructs said run time module to sequence through said document and to identify said codes, and to execute the following tasks:

(1) upon encountering any one of said question codes, evaluating the associated question information to determine whether an associated logic record exists, and, if no associated logic record exists, using the question information to present a question and receive an answer, and if an associated logic record exists, evaluating the associated logic record to determine whether to execute a logical expression in the action field of the associated logic record, and (2) upon encountering any one of said manipulation codes, evaluating the associated logic record to determine whether to execute a logic expression contained in the logic record, execution of the logic expression, if performed, resulting in manipulation of one or more of said answers or the generation of new content of said document.

2. The document assembly system of claim 1, wherein said question information includes question text data and question formatting data for presenting questions.

3. The document assembly system of claim 1, wherein said manipulation codes include insert codes, and wherein said processor, upon encountering any one of said insert codes, is operable to insert information as directed by the action field of an associated logic record if the appropriate condition is evaluated in the condition field of the associated logic record.

4. The document assembly system of claim 1, wherein said manipulation codes include delete codes, and wherein said processor, upon encountering any one of said delete codes, is operable to delete information as directed by the action field of an associated logic record if the appropriate condition is evaluated in the condition field of the associated logic record.

5. The document assembly system of claim 1, wherein each question record includes a logic field, said logic field being used to determine whether one or more associated logic records exist.

6. The document assembly system of claim 1, wherein each question record includes a value field, said value field being capable of being referenced by said condition fields.

7. The document assembly system of claim 1, wherein said condition fields include boolean logic.

8. The document assembly system of claim 1, wherein said condition fields include mathematical formulae.

9. The document assembly system of claim 1, wherein said action fields include executable commands.

10. The document assembly system of claim 1, each of said logic records further comprising a return value field, said return value field including an object for use in connection with said action field.

11. The document assembly system of claim 10, wherein said object comprises a string constant.

12. The document assembly system of claim 10, wherein said object comprises a string expression.

13. The document assembly system of claim 10, wherein said object comprises a mathematical expression.

14. The document assembly system of claim 1, and further comprising an assembly questions database including assembly questions information, and wherein said processor is operable to process assembly questions before sequencing through the document.

15. The document assembly system of claim 1, wherein action fields associated with question codes include default, copy, assign, and skip actions.

16. A method of assembling a document, comprising:

sequencing through the document to identify codes, the codes including question codes and manipulation codes;

upon encountering any one of the manipulation codes, evaluating an associated logic record of a logic database to determine whether to execute a logic expression of the associated logic record; and upon encountering any one of said question codes, evaluating question information of an associated question database to determine whether an associated logic record exists, and, if no associated logic record exists, using the question information to present a question and receive an answer, and if an associated logic record exists, evaluating the associated logic record to determine whether to execute a logic expression of the associated logic record;

wherein execution of any said logic expression is performed as said document is being assembled and results in the manipulation of one or more of said answers or the generation of new content of said document.

17. The method of claim 16, and further comprising asking assembly questions before sequencing through the document.

18. The method of claim 16, wherein the manipulation codes include insert codes, and further comprising, upon encountering any one of the insert codes, inserting information as directed by the action field of an associated logic record if the appropriate condition is evaluated in the condition field of the associated logic record.

19. The method of claim 16, wherein the manipulation codes include delete codes, and further comprising, upon encountering any one of the delete codes, deleting information as directed by the action field of an associated logic record if the appropriate condition is evaluated in the condition field of the associated logic record.

20. The method of claim 16, and further comprising validating an answer after the answer has been received.

21. A method of assembling a final document from a source document, comprising:

sequencing through the source document to identify a first said of question codes, which represent questions that determine what portions of said source document are to be included in said final document, and to identify manipulation codes;

upon encountering any one of said first set of question codes, evaluating question information of an associated question database to determine whether an associated logic record exists, and, if no associated logic record exists, using the question information to present a question and receive an answer, and if an associated logic record exists, evaluating the associated logic record to determine whether to execute a logic expression of the associated logic record;

upon encountering any one of the manipulation codes, evaluating an associated logic records of a logic database to determine whether to execute a logic expression of the associated logic records, execution of the logic expression, if performed, resulting in generation of content of said document; and wherein execution of any said logic expression may result in manipulation of said source document or in generating content of said final document; and repeating said evaluating steps for a second set of question codes, which represent questions that are to be used to complete said final document.

22. The method of claim 21, wherein said logic expressions determine whether one of said answers is to be inserted.

23. The method of claim 21, wherein said logic expressions calculate text to be inserted.

24. The method of claim 21, wherein said logic expressions perform boolean logic pertaining to at least one of said answers.

25. The method of claim 21, wherein said logic expressions retrieve text data from an external source.

26. The method of claim 21, further comprising the step of validating one or more of said answers.

* * * * *